March 21, 1961   P. KLAMP   2,976,376
CONVEYOR DISPATCH SYSTEM
Filed March 25, 1957   4 Sheets-Sheet 1
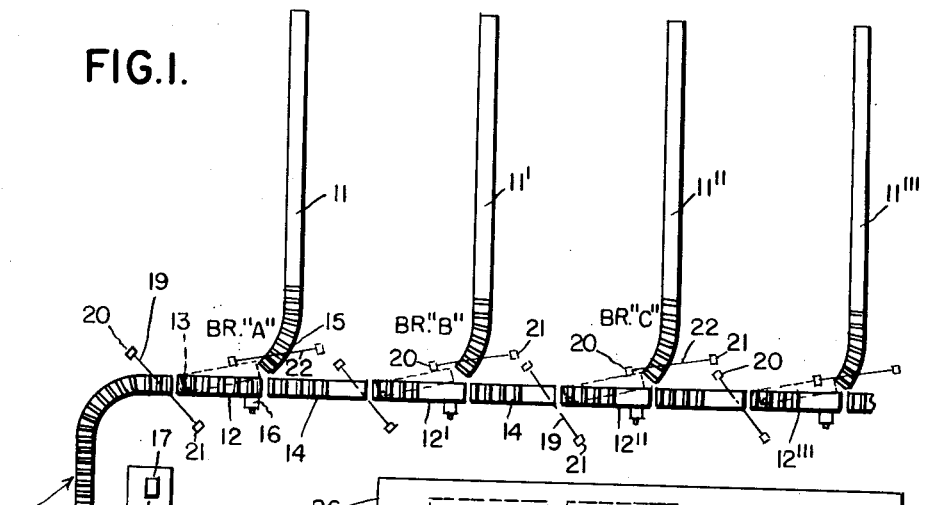
INVENTOR
PAUL KLAMP
BY Whittemore, Hulbert &
Belknap
ATTORNEYS March 21, 1961

P. KLAMP 2,976,376

CONVEYOR DISPATCH SYSTEM

Filed March 25, 1957

INVENTOR
PAUL KLAMP
BY Whittemore, Hulbert &
Belknap
ATTORNEYS

March 21, 1961
P. KLAMP
2,976,376
CONVEYOR DISPATCH SYSTEM
Filed March 25, 1957
4 Sheets-Sheet 3
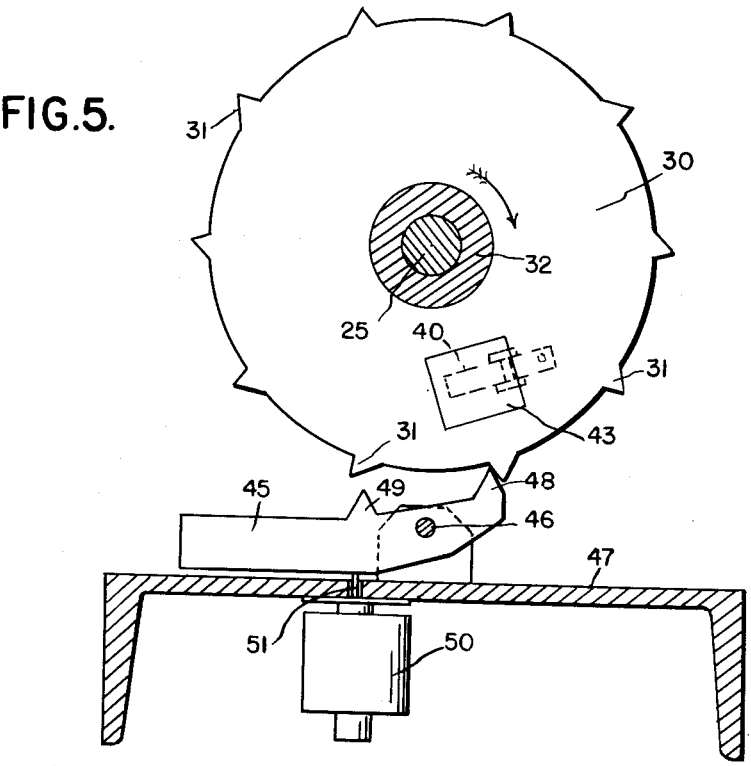
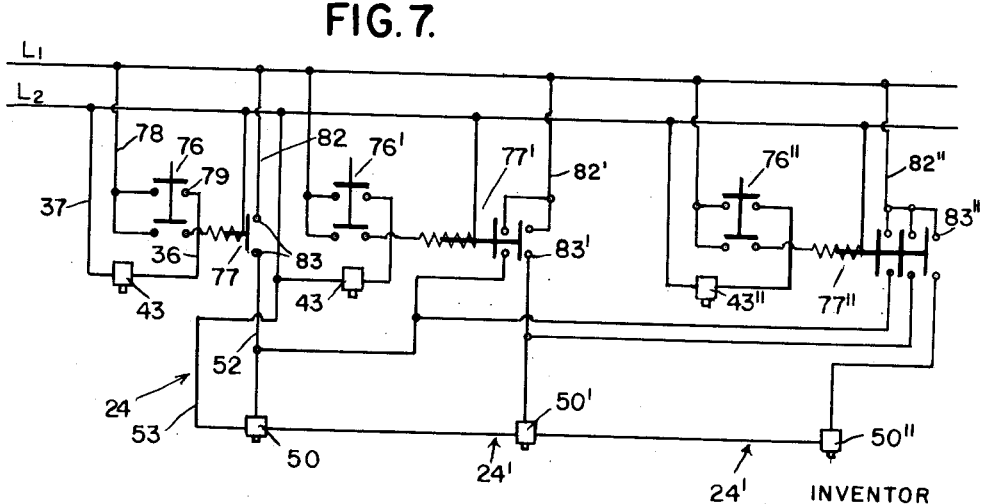
INVENTOR
PAUL KLAMP
BY Whittemore, Hulbert & Belknap
ATTORNEYS

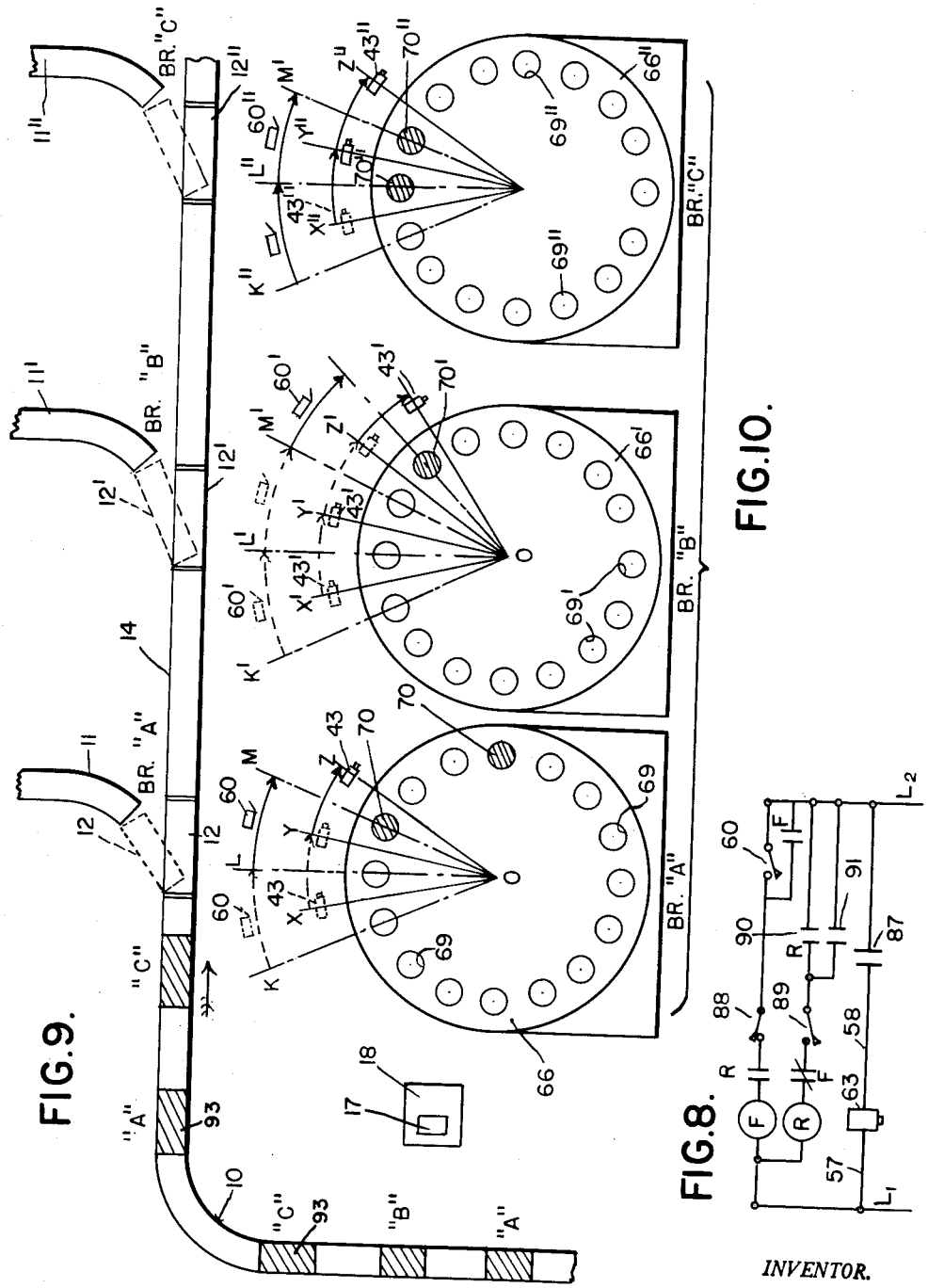

United States Patent Office 2,976,376
Patented Mar. 21, 1961

2,976,376

CONVEYOR DISPATCH SYSTEM

Paul Klamp, St. Clair Shores, Mich., assignor to Mechanical Handling Systems, Inc., Detroit, Mich., a corporation of Michigan Filed Mar. 25, 1957, Ser. No. 648,027

8 Claims. (Cl. 200—33)

The present invention relates to an improved conveyor dispatch system for the orderly, planned transportation and disposition of merchandise or like objects in a warehouse or equivalent storage or accumulation area.

A general object of the invention is to provide a system operating under the principle of position and counting control of objects dispatched to selected locations of the warehouse or like area in question, as distinguished from heretofore employed systems operating under the principle of distance control. Such a system is only suitable for use when the control instrumentalities governing dispatching are accurately synchronized with the drive of the conveyor means which effect the distribution, as by geared or chain drive connections, for example. By contrast, a position control system, in which successively advancing objects or groups or trains of objects are controlled in their ultimate disposition by a master control device which is set by reference to the relative succession in spacing as advanced, permits the use of a simpler and less expensive type of conveyor structure wherein no such coordination of its drive with that of the dispatch control mechanism is required.

More specifically, it is an object of the invention to provide a dispatch system of the sort described, in which the conveyor structure may be comprised of gravity roller and powered roller sections of known type, arranged to provide a main supply track or reach and successively spaced branch tracks or reaches diverging therefrom, together with movable switch tracks, preferably individually of the powered roller type, and an improved master control mechanism by which the switch track sections are moved predeterminedly to connect the main or supply track with selected branch tracks in accordance with an operator-performed setting of the master mechanism, on the basis of his observation of objects or trains of objects approaching the first branch track on the main or supply track.

Another object is to provide an improved master control device or mechanism to function in the manner described in the preceding paragraph, yet which is a broader application, particularly in other types of conveyor layout, and even more generally as an annunciator unit for diverse purposes.

More particularly, it is an object to provide an improved master controller of the displaceable pin type, in which a circumferential series of pins are supported for individual axial shift on a fixed mount, having improved means to frictionally resist to a desired extent their axial shift, and rotatably indexed "writer" and "reader" devices are on either axial side of said mount, carrying electric devices to operate and shift the pins and to be operated by the shifted pins, respectively. The supporting of the pins on a fixed mount, rather than a rotatable one, makes it possible to operate the controller using only a single electrical device or solenoid on the writer and a single device or switch on the reader.

In more specific reference to this mechanism it comprises generally similar, though differently functioning primary or "writer" and secondary or "reader" wheels rotatably mounted in laterally spaced relation to one another to index rotatively about a common axis. These wheels are disposed on either axial side of a common fixed disk unit which carries an annular series of settable pins concentric with the wheel axis.

The primary or writer wheel transports an electrically actuable pin-camming device and is controlled as to its rotary indexing movements by an electrically actuable escapement device; and the actuation of these two devices is controlled by an operator at a master control station on the basis of his observation of the spacing of objects or trains of objects advancing on the main conveyor track, and his knowledge of the desired ultimate distribution of the same to the branch tracks.

The secondary or reader wheel carries an electric micro-switch which is controlled in its action of partially completing an electrical switching circuit by a pin previously displaced on the fixed disk by the camming device of the writer wheel. The provision of an improved master memory unit of this sort is an important aspect of the invention.

Each of the powered roller type switch tracks serving a branch track is individually powered for bodily movement to switching position and return, as by an appropriate motor mounted to the switch track, and the energizing circuit for this motor is photoelectrically completed following its completion at the reader wheel micro-switch, by the approach of an object or train of objects to the selected branch track. As stated the track is selected by the setting of a pin by the writer wheel pin camming device.

The completion of the track switch motor circuit as last mentioned is effected in response to the interruption of a photoelectric beam by the advancing object or train. The photoelectric current surge thus occasioned triggers the energization of the electrical indexing escapement device for the reader wheel of the master control unit in question; and the ensuing indexing movement of that wheel causes its micro-switch to be closed by engagement with the pin as previously set by the writer wheel.

Thus, as the object or train reaches the switch track it has been positioned in lineal connection with the selected branch track. Photoelectric means are also positioned adjacent the entry of the branch track, so that as an object or train departs along the branch track a photoelectric beam is restored; and this restoration is utilized to reverse the operation of the switch track powering motor and return that track to its original position.

From this it is evident that it is a general object of the invention to provide an improved conveyor dispatch system, and in particular an improved, memory position control master device which is the essentially important component of the system under the invention, in which an operator may set up master control units, one for each branch track, to govern the ultimate switching and disposition of a relatively large number of successively advancing objects or trains of objects. In doing this he simply manipulates a push button at a master control station which governs the electrical actuation of the writer wheel indexing and camming devices, there being a writer and reader wheel assembly at the master station for each branch track and associated switch track. The rest of the operation is entirely automatic, and the system operates unfailingly, short of the limitation of human operator error, in dispatching the selected objects or trains, as keyed by the writer wheel and as interpreted by the reader wheel, onto the intended branch tracks.

The foregoing as well as other objects will be made more apparent as this description proceeds, especially when considered in connection with the accompanying drawings, wherein:

Fig. 1 is a fragmentary plan view, schematic in nature, of a conveyor dispatch system according to the invention, as in a relatively simple warehouse or like installation;

Fig. 2 is an end elevational view of a master control unit of the system;

Fig. 3 is a side elevational view of the master control unit;

Fig. 5 is a view in vertical section along line 5—5 of Fig. 4;

Fig. 6 is a fragmentary view in horizontal section along line 6—6 of Fig. 4;

Fig. 7 is a schematic wiring diagram showing circuitry involved in the manual push button operation of certain pin setting solenoids and indexing solenoids controlling the operation of the writer wheel components of several master branch track control mechanisms;

Fig. 8 is a schematic wiring diagram showing a typical reader wheel electrical circuit of a control mechanism, and wiring connecting the same with a switch track motor;

Figure 4:
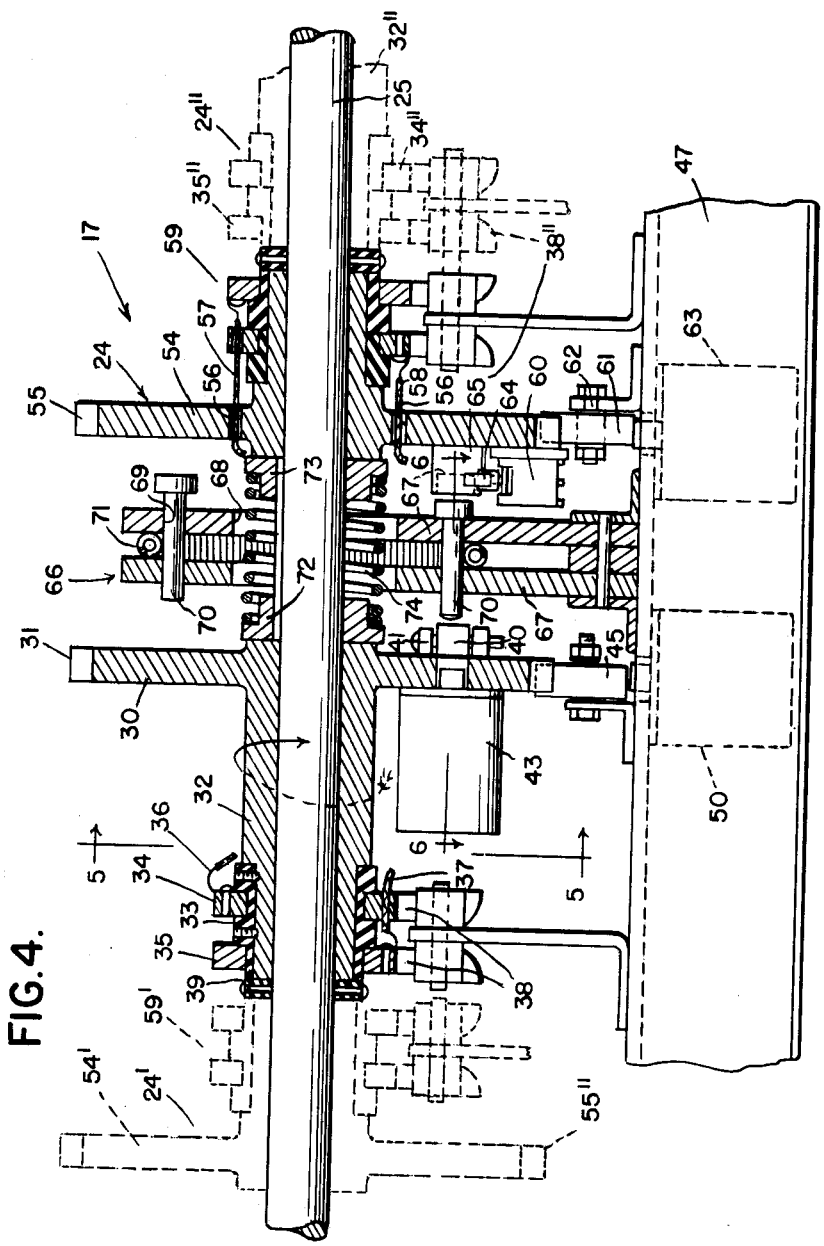
Fig. 4 is a fragmentary view in vertical axial section through a master control mechanism of the multiple unit of Figs. 2 and 3, with a portion of a corresponding coaxial master control mechanism for a different branch track indicated in dotted line.

Fig. 9 is a fragmentary layout in plan illustrating the operation of the master control unit in reference to the dispatch and distribution of conveyor-forward objects; and Fig. 10 is a view schematically showing a typical setting effected by the writer wheel controlling three branch switch tracks of an installation such as that of Fig. 1, in securing a desired distribution of objects to those tracks.

Referring to Fig. 1 of the drawings, the system of the invention, as typically installed for the servicing of a warehouse area or the like, comprises a main or supply conveyor 10 of a conventional type, for example a sectional gravity roller conveyor which may, in accordance with conventional practice, also embody powered roller sections (not shown). The reference numerals 11, 11', 11", 11'" designate branch tracks, also of the sectional roller type; and the reference numerals 12, 12', 12", and 12'", respectively, indicate switch tracks, one for each of the branch tracks 11 through 11'". The switch tracks 12 through 12'" are of the powered roller type, incorporating suitable means to positively drive the roller elements thereof, and each of the switch tracks 12, 12', 12" and 12'" is further equipped with suitable provisions to swing the latter about a pivot at 13 from the solid line position of Fig. 1, in which the track section is longitudinally aligned with a connecting track 14 (which in effect is a continuation of the main or supply track 10), and the dotted line position in which the track section feeds to an arcuate inner portion 15 of one of the branch tracks 11, 11', 11" and 11'". Such power for bodily swinging the switch tracks may be of any desired sort, and is conventionally shown as an electric motor 16 for each of the switch tracks 12, 12', 12" and 12'".

Reversing operation of the motors 16 is governed by electrical circuitry and control provisions at a master dispatch control unit 17 (Fig. 2) of the system, which is desirably located at a master observation station 18 (Fig. 1), in part by a photoelectric beam 19 projected from a light source 20 and impinging a photo-cell device 21, there being beam provisions of this sort associated with the main track 10, and each of its continuation sections 14 adjacent the entrance of each switch track 12, and in part by a further similar photoelectric beam 22 projected across the entrance zone of the arcuate portion 15 of each of the branch tracks 11 through 11'".

It is to be understood that the improved dispatch system will be employed optionally in the distribution of single objects traveling in successive, longitudinally spaced relation on the main track 10, or groups of objects each arranged as a train, with the respective trains in longitudinally spaced relation, or of mixed objects and trains. For example, a train of objects may occupy upon the conveyor a longitudinal overall distance of, say, 25 ft., with successive traveling trains or objects spaced from it and from one another a similar distance. This being the case it is necessary to insure that the respective photoelectric beams 19 or 22 be interrupted and restored only at the beginning and end of each train, and that no such interruption or restoration take place intermediate the length of a train.

Accordingly, as illustrated in Fig. 1, the light source 20 and photo cell 21 for the respective main and branch track beams 19, 22 are arranged at an acute angle to the direction of advance of objects or trains of objects traversing the tracks, preventing any change in the beam as it is being passed by a train whose component objects may have some longitudinal spacing from one another.

Structural provisions associated with the photoelectric devices, as well as in association with the power means 16 for the individually powered switch tracks 12, in accomplishing the desired movements of the track sections, are of a nature to suggest themselves to those skilled in the art, hence require no further illustration or description.

The master control unit 17 at observation station 18 is illustrated in a general way in Figs. 2 and 3 of the drawings. It is to be understood that each unit 17 controls the operation of a number of switch tracks 12, 12', etc., and a unit in which six such control mechanisms are employed is schematically shown. Of these, three master control mechanisms, sufficing for the purpose of present illustration, are designated respectively by the reference numerals 24, 24' and 24". Each such set of three mechanisms is mounted coaxially on a common driven shaft 25 appropriately journaled in a housing 26, or the like, and the sets are driven at corresponding speed, whenever the conveyor 10, its extensions 14 and the rollers of switch tracks 12 are driven. The drive is derived through a belt and pulley connection 27 to the shaft of a speed reducer 28 which is driven by an electric motor 29 of the unit 17.

Reference may be had to Fig. 4 of the drawings for structural features of one of the master control mechanisms 24, and the mechanisms 24' and 24" on the common shaft 25 are duplicates in all respects. It is therefore to be understood in the specification to follow that as the parts of mechanism 24 employed in the control of, say, a first switch track 12 for a branch track "A" (Fig. 1), corresponding elements of the duplicate mechanisms 24' and 24" function in the control of the second switch track 12' for the second branch track "B" (or 11'), the third switch track 12" for the third branch track "C" (or 11") etc., with the applicable reference numerals correspondingly primed.

The master control mechanism 24 shown in Fig. 4, reference also being made to Figs. 5 and 6 for further details, comprises a primary or "writer" wheel 30 of circular outline provided with indexing escapement teeth 31 (Fig. 5) spaced uniformly about its outer periphery, and further provided with an elongated hub 32 receiving the common shaft 25. The end of this hub has an insulating sleeve 33 secured thereon, which receives electrically conductive slip rings 34, 35. Conductors 36, 37 are connected to the respective slip rings, which rotate with the wheel 30 and are electrically energized in a conventional manner from fixed brushes 38. An insulating end thrust washer 39 separates the mechanism 24 from the adjoining mechanism 24'.

Referring to Fig. 6 in conjunction with Fig. 4, the primary or writer wheel 30 has a movable pin setting cam or tappet 40 pivotally mounted at 41 on its inner or righthand side, and a coil spring 42 urges this cam in clockwise direction about the pivot as viewed in Fig. 6. A pin set solenoid 43 is appropriately mounted on the opposite side of the writer wheel 30, and its plunger 44 bears against the cam 40 to urge the same operatively in the opposite direction. The function of the movable cam 40 will be hereinafter referred to.

Referring to Fig. 5 in conjunction with Fig. 4, the indexable writer wheel 30 is controlled as to its periodic indexing movement by an escapement arm 45 appropriately pivoted at 46 on the frame work 47 of the mechanism 24. The arm 45 has escapement teeth 48, 49 spaced on opposite sides of its pivot, which have a conventional escapement coaction with the teeth 31 of the wheel 30, in a manner hereinafter more fully described.

Swinging movement of escapement arm 45 is controlled by an index solenoid 50 mounted on the lower side of the frame work piece 47, the plunger element 51 of this solenoid engaging escapement arm 45 on the left-hand side of its pivot 46, as viewed in Fig. 5.

The slip ring electrical leads 35, 36 are connected to the coil of the pin set solenoid 43; and the coil of writer wheel index solenoid 50 is electrically connected in the writer wheel control circuit of Fig. 7, by leads 52, 53 appearing in that figure.

Referring again to Fig. 4, the reference numeral 54 designates a secondary or reader wheel of the master control mechanism 24 for the branch track 11. It is an indexing wheel similar in outline to the writer wheel 30, being provided with escapement teeth 55 spaced equally about its periphery. Reader wheel 54 is apertured at 56 to receive electrical leads 57, 58 which are energized through a slip ring device 59 similar to that servicing the writer wheel pin set solenoid 43; and the leads 57, 58 are connected to terminals of a conventional microswitch 60 mounted on the inner or lefthand side of the reader wheel 54.

Indexing movements of the reader wheel 54 are controlled by an escapement arm 61 which is pivotally mounted at 62 on the frame work piece 47. The escapement arm 61 is similar to the writer wheel escapement arm 45, and its swinging movements are controlled by an indexing solenoid 63 mounted on the frame work. The roller type actuating arm of microswitch 60 is designated 64.

A pin reset cam 65 is fixedly mounted on the inner side of reader wheel 54 directly behind the microswitch 60, in reference to the direction of rotative indexing movement, for a purpose to be described.

The reference numeral 66 generally designates a pin plate device which is fixedly supported by the frame work 47 in an appropriate fashion, being centered between the primary or writer and secondary or reader wheels 30, 54, respectively, and in a plane parallel thereto. Plate device 66 comprises a pair of fixed, laterally spaced supporting plates 67 apertured at 68 to receive the shaft 25 and other provisions, and the plates are each provided with a circular series of apertures 69, the respective plate apertures being axially aligned. Each of these apertures slidably receives a settable switch control pin 70, the illustrated pin plate device 66 being equipped with ten pins 70, though the number may be greater depending on the installation. The indexing teeth 31 of the wheel 30 are of like number. A coil type garter spring 71 encircles the series of pins 70 between the plates 67, imposing sufficient friction on the pins to permit a controlled endwise movement thereof in their apertures 69.

As shown, a set of three associated writer and reader wheels and pin plate device 66 constituting a master control mechanism 24, 24', etc. have a common drive from the shaft 25. This in an impositive drive, brought about through frictional engagement of oppositely acting washers 72, 73 encircling and keyed to the shaft 25, which are urged in opposite directions by a coil spring 74 therebetween. Thus, though the shaft 25 is positively driven continuously with the drive of the conveyor tracks, an intermittent indexing of the writer wheel 30 and reader wheel 54 is possible under the control of the respective escapement index arms 45, 61.

The pin set solenoid 43 and the index solenoid 50 for the writer wheel 30 are energized upon closure of a push button controlled master switch (Fig. 7) of the mechanism 24, which also controls the energization of a relay 77. The circuitry is simple, as depicted in Fig. 7. The pin set circuit is completed from a line wire $L_1$ through lead 78, terminals 79 of switch 76, lead 36, coil of pin set solenoid 43 and lead 37 to the second line wire $L_2$. The circuit for index solenoid 50 includes line lead 82, terminals 83 closed by energization of relay 77, lead 52, coil of index solenoid 50, and lead 53 to line wire $L_2$.

Corresponding circuits for the other master control writer wheels are readily traced in Fig. 7. The operation of the writer wheel index solenoid 50 upon closing of the push button switch 76 releases the writer wheel 30 to advance a distance of one tooth spacing and then is halted by its escapement arm 45. It is evident that the relay arrangement is such as to close the wheel indexing circuits for master control mechanisms 24 and 24' (but not their pin set circuits) when the switch 76" for mechanism 24" is closed. This insures simultaneous indexing of all mechanisms even though not selected.

The indexing motion of the reader wheel 54 is controlled by the solenoid beam 19 (Fig. 1) in advance of the swinging track switch 12. When this beam is interrupted by an advancing object or train of objects on the main or supply track 10, the index solenoid 63 for reader wheel 54 is energized, releasing the wheel for a single index increment of rotation, whereupon it is halted by the escapement arm 61.

During such rotation the micro-switch 60 on reader wheel 54 is momentarily operated by a control pin 70 of pin plate device 66 (which has been positioned by the pin set cam 40 upon push button-controlled energization of pin set cam 43 of writer wheel 30). Closure of the circuit at switch 60 completes a control circuit for the track switch motor 16, and the same swings from the solid line position of Fig. 1 to the dotted line position. The object or train is thus power driven by the so-positioned track switch onto the branch track 11.

In the interest of avoiding confusion of the mechanical conveyor track switch 12 with the reader wheel microswitch 60, the latter will be hereinafter referred to as a control element. Pins 70 are restored to their original, retracted condition by the reset cam 65 on wheel 54 during the indexing motion of the latter.

Circuitry for the control of the switch track motor 16 is shown in Fig. 8 of the drawings.

The reference numeral 87 denotes a contact which is closed when the entry photoelectric beam 19 is broken by an advancing object or train. Limit switches 88, 89 on the swinging track 12 control a typical reversing interlock circuit for the motor 16 which is completed when the reader control element or device 60 is operated. A contact 90 is closed when the branch track photoelectric beam 22, interrupted by a switched object or train, is restored; while the reference numeral 91 designates a relay contact. The invention is not directed to any particular electrical control circuitry for the purposes clearly set forth above, and any desired alternative arrangements may be made.

Figs. 9 and 10 represent an attempt to depict schematically the operation of the improved system, and should be referred to in conjunction with Fig. 4. Let it be assumed that successive objects or trains of objects advancing along main or supply track 10 are to be dispatched to the branch tracks "A," "B" and "C" in the order of application of the corresponding reference characters "A," "B" and "C" (Fig. 9) to the cross-hatched trains, which may further be referred to by the reference numeral 93. Let it also be assumed that, at the outset of a dispatching cycle, the pin set solenoids are in initial angular positions as shown in dotted line on the respective radial lines OX, OX', OX'', etc., on the respective fixed pin plate devices 66, 66', 66'', etc., appearing in Fig. 10. Let it further be assumed that at this time the respective reader wheel control elements 60 are in the angular positions along dot-dash radial lines OK, OK', OK'', and that photoelectric beams 19 and 22 exist at the respective main track or track sections and branch tracks.

Noting the desired order of switching "C," "A," "C," "B," "A," the operator at master control station 18 proceeds to manipulate the push button switches 76, 76', 76'' for the respective branch tracks "A," "B," "C" in timed order corresponding to the desired switching order to set the respective control pins 70, 70', 70'', etc., in the fashion illustrated in Fig. 10. Thus, since the first train "A" is to enter branch track "A" (or 11) only after a preceding train "C" has passed the same without switching, the push button switch 76 controlling the first reached "A" branch 11 is not pressed as the first control operation performed by the operator, and its pin set solenoid 43 is left de-energized at the outset as indicated in dotted line. Similarly, since the first train destined for "B" track 11' to appear in the advancing trains is to be switched only after two trains "C" have passed the "B" branch switch track 12', the push button switch 76' is operated only after operation of the switches 76'' and 76 has transpired. Thus the pin set solenoid 43' for "B" branch track 11' is not energized until two indexing movements of its writer wheel 30' are completed.

It is "C" branch track 11'' which is to receive the first train to reach it, hence its pin set solenoid 43'' is push button energized by the operator at the outset of operation. This indexes writer wheel 30'' and displaces its control pin 70'' to position in which it may be engaged with and operate reader wheel control element 60'' upon the first indexing movement of said reader wheel. Writer wheels 30 and 30' index with wheel 30'', but without shifting of a camming pin on either, as mentioned.

As pointed out above, push button indexing of a prime numbered writer wheel is attended by simultaneous indexing of all writer wheels preceding it, but not by actuation of their pin set cams. As depicted schematically in Fig. 10. successively indexed movements of the writer wheel pin set solenoids 43, 43', 43'' take place from radial lines OX, OX', etc., to radical lines OY, OY', etc., OZ, OZ', etc. In so moving the solenoids remain de-energized (dotted line) or become energized to set their pins 70, 70', etc., as indicated by hatching.

Fig. 10 also schematically depicts indexing movements of the reader wheels 54, 54', 54'', etc., and their associated control elements 60, 60', 60'', etc., following each of the respective writer wheel pin settings, as mentioned above. The initial angular reader wheel position, in the case of the respective master control mechanisms 24, 24', 24'' is, as stated above, indicated by the dot-dash radial reference lines OK, OK', OK''. Since upon commencement of operation a control pin 70 for branch track "A" has not been displaced to operative position, the passage of the first train "C" past the first switch track 12 will be effective to energize the index solenoid 63 for the first branch track reader wheel 54, but its control element or unit 60 will not become operative to close the electrical motor control circuit for branch track "A," the control unit 60 being thus indicated in an inoperative, dotted line position for this index phase. It is, however, made operative as shown in solid line, during the succeeding phase, in which the element 60 indexes from radial, dot-dash reference line OL to the corresponding reference line OM.

It is believed that the operation of the system is clear from the foregoing. Switch tracks 12'', 12 and 12' are set up or conditioned for operation in that order, and the respective writer and reader wheels 30 and 54, 30' and 54', etc., index in alternation upon successive manipulations of their master push button control switches 76, 76', etc.; the successive switch tracks 12, 12', etc., come into operation only when the respective solenoid controlled pin setting cams 40, 40', etc., are so actuated as to position their respective pins 70, 70', etc., to engage control elements 60, 60', etc., in the desired order.

Return of the switch tracks to original position is governed by limit switches, under the further control of a circuit photoelectrically completed upon restoration of the branch track photoelectric beams 22.

The invention provides a master control unit and conveyor system operated thereby which is of reliable character and relatively simple and inexpensive. It has great flexibility as to its adaptation in various types of installations, warehousing or otherwise. It does not require accurate correlation of speed of operation of the control unit with the conveyor power system, since it operates under the principle of position control, rather than distance control, as in installations heretofore commonly employed.

What I claim as my invention is:

1. A control unit comprising primary and secondary wheels coaxially mounted for indexing rotation, means to impositively drive said wheels, electrically energizable devices controlling periodic indexing of said respective wheels in timed relation to one another under said impositive drive, a fixed circumferential series of shiftable control elements arranged coaxially of and between said wheels, said primary index wheel having an electrically responsive actuator member thereon operable when electrically energized to shift one of said elements, in accordance with the rotatively indexed position of said wheel, from an inoperative to an operative position, said secondary index wheel having an electrical switch member rotatable therewith and actuated by said shifted element, and manually controlled means governing energization of one of said first named control devices to effect simultaneous indexing of said primary wheel and energization of said actuator member and to effect energization of the other of said first named devices to control indexing of the secondary wheel.

2. A control unit comprising primary and secondary wheels coaxially mounted for indexing rotation, a device controlling periodic indexing of said wheels in timed relation to one another, a fixed circumferential series of shiftable control elements arranged coaxially of said wheels, said primary index wheel having an electrically responsive actuator member thereon operable when electrically energized to shift one of said elements, in accordance with the rotatively indexed position of said wheel, from an inoperative to an operative position, a device controlling energization of said actuator member, said secondary index wheel having an electrical switch member rotatable therewith and actuated by said shifted element, manually controlled means governing operation of said control devices to effect simultaneous indexing of said primary wheel and energization of said actuator member, and further means electrically energized periodically to govern indexing of said secondary wheel.

3. A control mechanism comprising a driven shaft, first and second wheels having means mounting the same for rotation about a common axis, friction means connecting said wheels to said shaft to enable the latter to exert an impositive, yieldable driving force on said wheels to rotate the same, means including an escapement mechanism operatively connected with said wheels to control intermittent rotation of said wheels by said friction means, the first wheel having an actuator element thereon rotatable therewith, the second wheel having thereon an actuated element rotatable therewith, and a circumferentially fixed series of shiftable control elements having means to mount the same between said wheels in position for engagement and shifting of said control elements by the actuator element of said first wheel in the rotation of the latter, and to be engaged by the element of said second wheel in the rotation thereof.

4. A control mechanism comprising a driven shaft, first and second wheels having means mounting the same for rotation about a common axis, friction means connecting said wheels to said shaft to enable the latter to exert an impositive, yieldable driving force on said wheels to rotate the same, means including an escapement mechanism operatively connected with said wheels to control intermittent rotation of said wheels by said friction means, the first wheel having an actuator element thereon rotatable therewith, the second wheel having thereon an actuated element rotatable therewith, a circumferentially fixed series of shiftable control elements having means to mount the same between said wheels in positon for engagement and shifting of said control elements by the actuator element of said first wheel in the rotation of the latter, and to be engaged by the element of said second wheel in the rotation thereof, and means to selectively operate said actuator element in timed relation to the operation of said control means.

5. A control mechanism comprising a plurality of similar control units, each comprising a pair of coaxial, first and second wheels, means mounting said wheels for rotation, said first wheels each having an independently operated actuator element thereon rotatable therewith, said second wheels each having thereon an independently operated actuated element rotatable therewith, control means to control intermittent rotation of said wheels, including means to cause simultaneous rotation of said first wheels of said respective units and to operate the actuator element of one thereof independently of that of another, and a circumferentially fixed series of shiftable control elements for each of said wheel pairs having means to mount the same between the respective wheels of the pair in position for selective engagement and shifting by the respective actuator elements of said first wheels when said actuator elements are operated, and to be engaged by the actuated elements of said respective second wheels in the rotation thereof, said control means further including means to selectively rotate said respective second wheels independently of one another to so engage said actuated elements with said control elements.

6. A control mechanism comprising a plurality of similar control units, each comprising a pair of coaxial, first and second wheels, means mounting said wheels for rotation of said respective pairs about a common axis, drive means to exert driving force on said wheels to rotate the same, said first wheels each having an independently operated actuator element thereon rotatable therewith, said second wheels each having thereon an independently operated actuated element rotatable therewith, control means to control intermittent rotation of said wheels by said last named means, including means to cause simultaneous rotation of said first wheels of said respective units and to operate the actuator element of one thereof independently of that of another, and a circumferentially fixed series of shiftable control elements for each of said wheel pairs having means to mount the same between the respective wheels of the pair in position for selective engagement and shifting by the respective actuator elements of said first wheels when said actuator elements are operated, and to be engaged by the actuated elements of said respective second wheels in the rotation thereof, said control means further including means to selectively rotate said respective second wheels independently of one another to so engage said actuated elements with said control elements.

7. A control mechanism comprising a plurality of similar control units, each comprising a pair of coaxial, first and second wheels, means mounting said wheels for rotation, means to exert an impositive, yieldable driving force on said wheels to rotate the same, said first wheels each having an electrically responsive and independently operated actuator element thereon rotatable therewith, said second wheels each having thereon an independently and electrically actuated element rotatable therewith, control means to control intermittent rotation of said wheels by said last named means, including means to cause simultaneous rotation of said first wheels of said respective units and to operate the actuator element of one thereof independently of that of another, and a circumferentially fixed series of shiftable control elements for each of said wheel pairs having means to mount the same between the respective wheels of the pair in position for selective engagement and shifting by the respective actuator elements of said first wheels when said actuator elements are operated, and to be engaged by the actuated elements of said respective second wheels in the rotation thereof, said control means further including means to selectively rotate said respective second wheels independently of one another to so engage said actuated elements with said control elements.

8. A control mechanism comprising a plurality of similar control units, each comprising a pair of coaxial, first and second wheels means mounting said wheels for rotation of said respective pairs about a common axis, means to exert an impositive, yieldable driving force on said wheels to rotate the same, said first wheels each having an electrically responsive and independently operated actuator element thereon rotatable therewith, said second wheels each having thereon an independently and electrically actuated element rotatable therewith, control means to control intermittent rotation of said wheels by said last named means, including means to cause simultaneous rotation of said first wheels of said respective units and to operate the actuator element of one thereof independently of that of another, and a circumferentially fixed series of shiftable control elements for each of said wheel pairs having means to mount the same between the respective wheels of the pair in position for selective engagement and shifting by the respective actuator elements of said first wheels when said actuator elements are operated, and to be engaged by the actuated elements of said respective second wheels in the rotation thereof, said control means further including means to selectively rotate said respective second wheels independently of one another to so engage said actuated elements with said control elements.

References Cited in the file of this patent

UNITED STATES PATENTS

| Number | Name | Date |
|---|---|---|
| 1,355,829 | Ford | Oct. 19, 1920 |
| 2,010,044 | Temple | Aug. 6, 1935 |
| 2,020,877 | Coolidge | Nov. 12, 1935 |
| 2,217,342 | Ladrach | Oct. 8, 1940 |
| 2,260,980 | Newell | Oct. 28, 1941 |
| 2,433,685 | Dowell | Dec. 30, 1947 |
| 2,572,609 | Gierwiatowski | Oct. 23, 1951 |
| 2,601,154 | Krueger et al. | June 17, 1952 |
| 2,636,622 | Saxe | Apr. 28, 1953 |
| 2,690,800 | Ross | Oct. 5, 1954 |
| 2,721,914 | Cheltz | Oct. 25, 1955 |
| 2,773,596 | Bartlett | Dec. 11, 1956 |
| 2,904,111 | Knokey | Sept. 15, 1959 |